United States Patent
Hopkins et al.

(10) Patent No.: US 12,092,600 B2
(45) Date of Patent: Sep. 17, 2024

(54) RESISTIVITY IMAGING SYSTEM WITH COMPENSATOR FOR PARASITIC IMPEDANCES BETWEEN ELECTRODES AND THEIR CONDUCTIVE SUBSTRATES

(71) Applicant: QinetiQ Limited, Hampshire (GB)

(72) Inventors: Michael William Hopkins, Hampshire (GB); Rajinder Singh, Berkshire (GB); Lyn David Jones, Hampshire (GB)

(73) Assignee: QinetiQ Limited, Hampshire (GB)

( * ) Notice: Subject to any disclaimer, the term of this patent is extended or adjusted under 35 U.S.C. 154(b) by 198 days.

(21) Appl. No.: 17/757,128

(22) PCT Filed: Dec. 17, 2020

(86) PCT No.: PCT/GB2020/000105
§ 371 (c)(1),
(2) Date: Jun. 9, 2022

(87) PCT Pub. No.: WO2021/123704
PCT Pub. Date: Jun. 24, 2021

(65) Prior Publication Data
US 2023/0003677 A1 Jan. 5, 2023

(30) Foreign Application Priority Data
Dec. 18, 2019 (GB) ..................... 1918713

(51) Int. Cl.
*G01N 27/22* (2006.01)
*G01V 3/22* (2006.01)
(Continued)

(52) U.S. Cl.
CPC ............. *G01N 27/228* (2013.01); *G01V 3/22* (2013.01); *G01V 3/24* (2013.01); *E21B 47/0025* (2020.05)

(58) Field of Classification Search
CPC .. G01N 27/228; G01N 27/028; G01N 27/045; G01V 3/22; G01V 3/24;
(Continued)

(56) References Cited

U.S. PATENT DOCUMENTS 6,600,321 B2 7/2003 Evans
6,809,521 B2 10/2004 Tabarovsky et al.
(Continued)

FOREIGN PATENT DOCUMENTS

EP 2551701 1/2013
WO 2007/055786 5/2007

OTHER PUBLICATIONS

Intellectual Property Office, Search Report mailed Jul. 1, 2022, issued in connection with Application No. GB1918713.7, 4 pages.
(Continued)

*Primary Examiner* — Christopher P McAndrew
*Assistant Examiner* — Zannatul Ferdous
(74) *Attorney, Agent, or Firm* — McDonnell Boehnen Hulbert & Berghoff LLP

(57) ABSTRACT

A system for imaging material, typically in an underground scenario, comprising of a plurality of conductive electrodes supported on a conductive substrate positionable in an environment to be imaged, a signal generator connected to at least two of the electrodes, and a signal detector connected to at least two of the electrodes, and wherein an impedance compensator is arranged between each electrode and its substrate to counter parasitic impedance between the two. Typically the impedance compensator may be arranged to act as a negative capacitance, which may be approximately equal to any capacitance between the electrode and the substrate. An electrode may be a drive electrode coupled to a signal generator, or a detector electrode coupled to a detector, or may be reconfigurable to act as either one.

16 Claims, 4 Drawing Sheets

Figure 1:
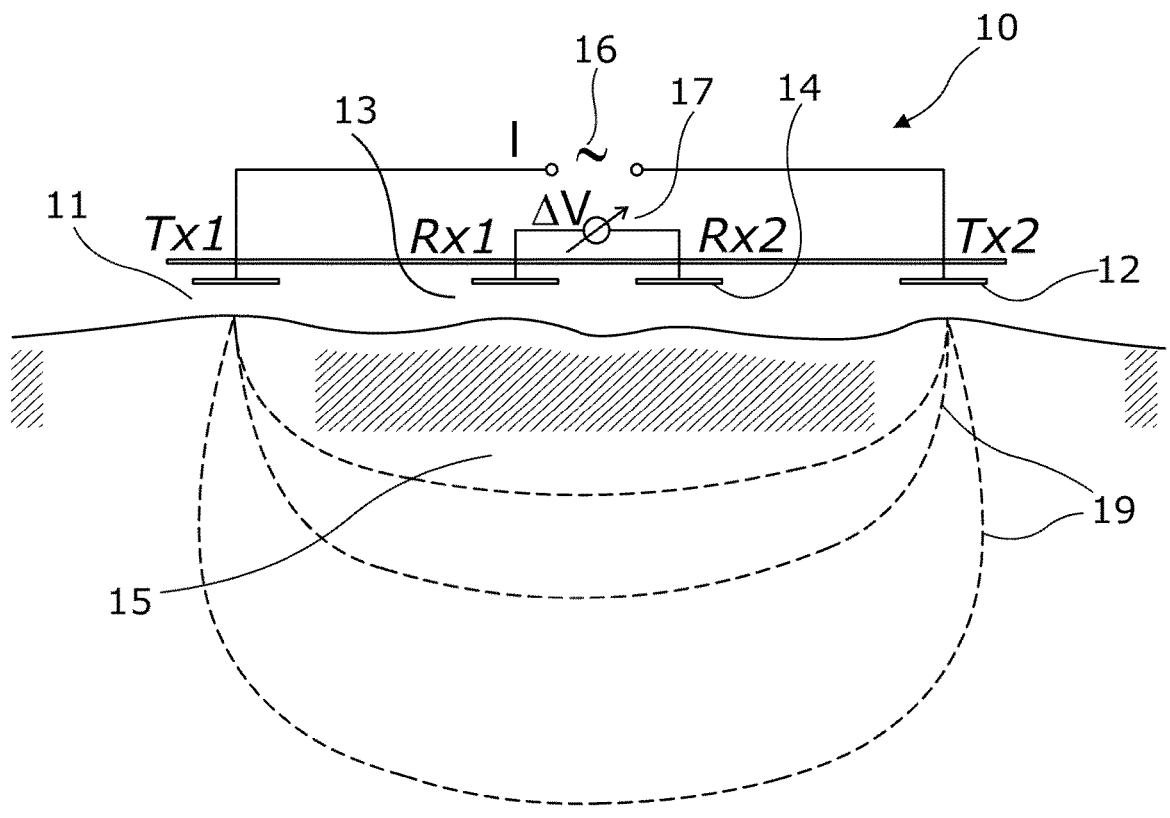

(51) Int. Cl.
*G01V 3/24* (2006.01)
*E21B 47/002* (2012.01)

(58) Field of Classification Search
CPC ... G01V 3/06; G01V 3/38; G01V 3/04; E21B 47/0025; E21B 49/00
See application file for complete search history.

(56) References Cited

U.S. PATENT DOCUMENTS

| | | | |
|---|---|---|---|
| 7,492,168 B2 | 2/2009 | Ogilvy et al. | |
| 8,232,803 B2 | 7/2012 | Bloemenkamp | |
| 10,422,672 B1* | 9/2019 | Libsch | G01F 1/584 |
| 2005/0279631 A1 | 12/2005 | Celentano | |
| 2007/0152756 A1* | 7/2007 | Li | H03F 3/08 |
| | | | 330/308 |
| 2009/0114244 A1* | 5/2009 | Sexton | H01J 37/32091 |
| | | | 134/1.1 |
| 2010/0013487 A1 | 1/2010 | Bloemenkamp | |
| 2011/0046505 A1* | 2/2011 | Cornish | A61B 5/7282 |
| | | | 702/65 |
| 2011/0140702 A1 | 6/2011 | Bloemenkamp | |
| 2013/0278277 A1* | 10/2013 | Trattler | H03K 17/962 |
| | | | 324/679 |
| 2014/0375320 A1 | 12/2014 | Liu et al. | |
| 2016/0265349 A1* | 9/2016 | Saulnier | H04B 11/00 |
| 2018/0004027 A1* | 1/2018 | Lin | G02F 1/133516 |
| 2018/0028150 A1* | 2/2018 | Kandori | B06B 1/0622 |
| 2021/0003523 A1* | 1/2021 | Chandak | G01N 27/028 |

OTHER PUBLICATIONS

International Searching Authority, International Search Report and Written Opinion mailed Mar. 25, 2021, issued in connection with International Patent Application No. PCT/GB2020/000105 filed on Dec. 17, 2020, 10 pages.

* cited by examiner

RESISTIVITY IMAGING SYSTEM WITH COMPENSATOR FOR PARASITIC IMPEDANCES BETWEEN ELECTRODES AND THEIR CONDUCTIVE SUBSTRATES

The present application is a national stage entry of PCT/GB2020/000105 filed on Dec. 17, 2020, which claims priority to Great Britain Patent Application No. 1918713.7 filed Dec. 18, 2019, the contents of each of which are hereby incorporated by reference.

The present invention relates to imaging methods, techniques and systems, having applications particularly but not exclusively in fields including geological exploration and characterisation, industrial tomography, non-destructive evaluation and fluid or object detection.

Capacitive-resistive imaging is a technique that can be used in measurement of subterranean geological formations and similar, typically (but not exclusively) downhole environments, and also has efficacy in other environments. With this technique, a plurality of conductive electrodes are placed, generally alongside or spaced apart from each other on a plane flat or curved surface such as the side of a tube, and impedance measurements are taken between electrodes to build up a picture of impedances present between the various conductive electrodes. The impedances are influenced by the geological materials surrounding the electrodes, which then are used to infer properties of the materials. An image can be built up by making successive measurements at different times or locations, or between different pairs of electrodes to get a better idea of temporal or spatial changes in the local environment.

A closely related technique is that of resistive imaging, where a galvanic resistance measurement (as opposed to a capacitive measurement) is made between electrodes.

The conductive electrodes are, when used in geological exploration, often mounted to an outer surface of a metal well pipe or the like. The electrodes are insulated from the pipe to prevent the pipe acting as a direct short circuit between them. They also often have (when used in capacitive-resistive imaging) an insulated covering protecting them from direct galvanic contact with the surrounding geology. Thus, they are effectively capacitively coupled to their environment.

U.S. Pat. No. 6,809,521 discloses one such system using these techniques. As disclosed therein, a signal is provided to a first electrode, and a differential measurement is made between that electrode and a second electrode positioned nearby. At lower frequencies the capacitance between the electrodes tends to dominate the measurement, manifesting itself as a phase shift between a measured current signal supplied to the first electrode, and a voltage drop between the first and second electrodes. A higher operating frequency is therefore chosen to reduce this effect and instead make the resistance of the material between electrodes the dominant factor in any measurements made. Multiple frequencies may also be used to improve measurements made.

U.S. Pat. No. 6,600,321 discloses a capacitively coupled resistive imaging system for use in borehole investigations. Here, a relatively high operating frequency (of around 1 MHz) is employed to measure that the resistivity of formations surrounding the borehole. The high frequency reduces the capacitive impedance to levels whereby it can be ignored. However, the penetrative range may be much diminished with such high frequencies.

One downside with these techniques is that it is still not possible to completely remove the electrical conductivity effects of metal in supporting structures. For CRI, this has a parasitic effect on the transmitter and receiver electrodes or nodes as some of the electrical energy will try to flow through the metal pipe rather than desired geological path, with the overall effect of limiting the performance of the imaging technique compared to using the technique mounted on an electrically insulated pipe or material.

In prior resistive systems, which often use either DC or near DC frequencies, as a method of injecting current into a medium (such as the local geology), the use of metal supporting structures such as metal pipes presents a big coupling path for the currents to flow into, which severely limits their utility when used with such supporting structures.

According to a first aspect of the present invention, there is disclosed an imaging system for imaging of materials, comprising of:

a plurality of conductive electrodes positionable in an environment to be imaged;

a signal generator connected to at least two of the electrodes;

a signal detector connected to at least two of the electrodes;

wherein the electrodes are supported on one or more conductive substrates characterised in that it further comprises an impedance compensator arranged to counter parasitic impedance between each electrode and its substrate.

Embodiments of the invention therefore allow currents that would otherwise flow through parasitic impedances that are present between the electrodes and the substrate to be provided by the impedance compensator rather than the signal of interest. The compensator effectively acts to decouple the electrode from its substrate by adding an equivalent amount of electrical energy to the transmit electrodes as is taken from the signal source through the parasitic impedance.

Due to the proximity of an electrode to its substrate, there is a tendency, in prior art systems, for energy to flow, either capacitively or conductively, into the substrate, and to use the substrate as a preferential signal path. This reduces the energy flowing through the medium to be imaged, such as geological matter, and hence makes imaging the medium more difficult. The present invention acts, using the impedance compensator, to supply, with a separate source other than the signal supplied to the electrodes, a current between the electrode and its substrate that would otherwise be drawn from the signal generator.

Typically, an embodiment of the system will have a negative impedance converter on each of the electrodes, although it will be appreciated that a beneficial effect will still be achieved if at least some of the electrodes are arranged to have a negative impedance converter associated therewith.

The impedance compensator may comprise, in some embodiments, a negative impedance circuit. Such circuits are known.

Advantageously, the negative impedance circuit is arranged to have a negative impedance between a given electrode and the substrate approximately equal to the impedance between the given electrode and the conductive support, at the frequency of operation. The impedance may be a resistance (i.e. real), or may be a complex impedance, or may be purely imaginary. The negative impedance does not need to be exactly equal (in absolute terms) to the impedance between the given drive electrode and the conductive support to have beneficial effect, but the closer the match the better will be the cancellation of the parasitic impedance, resulting in an improved imaging signal.

In some embodiments, the negative impedance converter will comprise a negative capacitance. This is because, in general, the parasitic impedance that exists between a drive electrode and a supporting conductive structure will be a capacitance. Other embodiments may use a negative inductance, or resistance, or may use some combination thereof.

For resistive imaging system, where the DC resistance between electrodes is measured to provide image information then the compensator may conveniently comprise a DC power source arranged to supply a current approximately equal to the current that would flow due to whatever voltage was present between the electrode and its substrate.

The negative impedance circuit may advantageously comprise a one-port amplifier circuit configured to be an electrical drive that provides a current in anti-phase into a circuit to which it is connected Advantageously, in some embodiments the amplifier may comprise an operational amplifier.

Some embodiments may employ a negative impedance circuit having a fixed value of negative impedance, where the fixed value of negative impedance is arranged to cancel a measured or predicted parasitic impedance between a drive electrode (i.e. an electrode connected to a signal generator) and the conductive support.

Advantageously, some embodiments may have means for adjusting a supplied current, from the signal generator, based upon a measurement of coupling between its associated electrode and the substrate. Thus, in such embodiments, the negative impedance may be varied to match, or approximate to a measured impedance between the electrode and its substrate. This allows a calibration of the impedance compensator to be performed. Such a calibration may typically be done periodically, such as on a daily or weekly basis. Embodiments of the impedance compensator will generally have an amplifier component therein, the amplifier having a gain. In such embodiments, where the compensator circuit comprises such an amplifier, the gain of the amplifier may be varied to effect this calibration.

Advantageously, some embodiments further comprise a means for measuring the coupling comprising current measuring means for measuring a current flow between the signal generator connected to the electrode and the electrode itself. Such means may comprise e.g. a low-value resistor that may be switchable in and out of a current path to the electrode, or may comprise some other current measuring means such as a sense coil around a cable feeding the electrode.

Alternatively, the means for measuring the coupling may comprise a sensor arranged to measure an electric field emanating from the electrode into its surrounding environment, at a position more distant from the substrate than the electrode-substrate distance. With such a means, the impedance compensator may be arranged to vary a current at the same frequency as is driven into the electrode by the signal generator, such that the electric field sensed with the electric field sensor is at a maximum.

Advantageously, in some embodiments, an electrode is reconfigurable between being a drive electrode and a sensor electrode (i.e. an electrode connected to a signal detector). Thus, an electrode may be switchable between a drive mode and a sensor mode. Such an arrangement allows greater flexibility in layout of the electrodes, and allows versatility in taking measurements from different electrodes, by using different patterns of "transmit" electrodes (i.e. those connected to a signal generator), and "receive" electrodes (i.e. those connected to a signal detector).

Alternatively, in some embodiments, the electrode(s) to which the signal detector is connected are separate from the electrode(s) connected to a signal generator.

A typical system will generally have at least two sensor electrodes. Advantageously, at least 3, 4, 5, 8, 12 or more receive electrodes may be used, spaced within a reception zone of the transmit electrodes, with the signal detector being arranged to measure signals from two or more of them. By measuring signals from different receive electrodes, located in different positions, information from different—possibly overlapping—regions of the material surrounding the electrodes may be measured. A more comprehensive image of the material may therefore be built up.

In some embodiments one or more receive electrodes are physically located between at least two transmit electrodes, and within an electric field that, in use, spans between the transmit electrodes. It will be understood that sensed signal levels from receive electrodes will tend to be greatest when the sensor electrodes are between the drive electrodes, such as on a notional straight line between electrodes, and will tend to reduce as they are located further away from the notional straight line. Sensor electrodes can, in some embodiments, sit generally between the drive electrodes but be located transversely or longitudinally displaced from the notional straight line, and be within a reception zone of the drive electrodes, thus still being able to receive useful signal levels.

Thus, in some embodiments, where there are at least four electrodes, with at least two arranged to connect to the signal generator, and at least two arranged to connect to the signal detector, the at least two electrodes connected to the signal generator are arranged with the two electrodes connected to the signal detector located between them.

Alternatively, or as well, in some embodiments where there are at least four electrodes, with at least two arranged to connect to the signal generator, and at least two arranged to connect to the signal detector, the at least two electrodes connected to the signal generator are nearest neighbours to each other, and the at least two electrodes connected to the signal detector are likewise nearest neighbours to each other.

The particular arrangements of sensor and drive electrodes may be switchable between these, or other arrangements, as would be understood by a person of ordinary skill in the art.

In some embodiments the electrodes comprise flat or curved plates. The plates may be made from metal, such as copper or aluminium, steel, including stainless steel, gold plate, or may be made from some other conductive material, such as carbon fibre. They may typically be generally square or rectangular in shape, and may be sized to be proportionate to the substrate on which they are mounted. A typical size may range from 5 cm to 50 cm along one side. It will be appreciated that different sizes and shapes may be used (including sizes and shapes outside of those mentioned above) according to the requirements and constraints of any particular application.

In some embodiments the substrate may comprise of a metal pipe. This is advantageous for use in a down-hole environment, such as a well.

In some embodiments the substrate may comprise of a conductive plate, casing, cable, frame or the like.

Each electrode may be positioned to sit spaced from the substrate, but substantially parallel thereto. It may be separated by a distance, typically between 5 mm and 5 cm, although of course this may vary e.g. according to practicalities of a given application.

In some embodiments, a control unit may sit alongside, or otherwise in proximity to one or more electrodes to which it is connected. The control box may contain drive electronics, such as a signal source, a receiver, for receiving signals from the electrode(s), and the impedance compensator circuitry. In some embodiments, each electrode may be switchably configured either as a transmit electrode, or a receive electrode, by appropriate programming of the control unit. This allows versatility in a configuration of multiple electrodes between Tx (transmit) and Rx (receive) modes, and hence a versatility in measurement, as mentioned above.

The impedance compensator for a given electrode has first electrical attachment to the electrode, and a second electrical attachment to the substrate. The connection to the substrate and/or the electrode may comprise of a single, or multiple physical attachments. For example, there may be more than one electrical cable used, with attachments points on the substrate being spread around the vicinity of the electrode. There may be, in some embodiments, a single electrical connection to the substrate. This may advantageously be on the substrate at a point close to the electrode.

In some embodiments the signal generator comprises of a signal source. It may in some embodiments be a variable frequency signal source. The signal source may be arranged to work at DC, or near DC frequencies. The signal source may be arranged for example to provide a defined voltage or current at the chosen frequency. The frequency of operation may be variable, or fixed. The impedance compensator may be arranged to supply a similar defined voltage or current, and may be arranged to have a similar frequency of operation (including, in some embodiments encompassing DC) to that of the signal source.

The frequency of operation of the imaging system may be chosen based upon characteristics such as the properties of material being imaged, and the spacing of the electrodes from each other, as would be understood by those skilled in the art. Typically it may be chosen from a range between DC and 20 KHz, but it has efficacy above this too.

In some embodiments the characteristics (e.g. voltage, frequency etc.) of the signal produced by the signal generator may be adjustable, and may be arranged to change over time. In this way, further information about the materials may be gleaned.

In some embodiments the signal detector may comprise of an analogue or digital receiver, as would be understood by those skilled in the art.

Embodiments may have a processor arranged to receive signals from the sensor electrodes, and to process these into image data, as is currently done in known imaging systems. The processor may also be arranged to control the impedance compensators, e.g. to instigate or control any calibration activities of the impedance compensators. The processor may also be arranged to switch the electrodes into a transmit (drive) or receive (sensor) mode as required.

In some embodiments the electrodes may be mounted on a conductive support, acting as a substrate, that comprises of a metallic pipe, of a type that is frequently used in underground oil, water or gas wells. The electrodes may advantageously be positioned at spaced-apart axial positions on such a pipe. Spacings between electrodes of between approximately 50 cm, 1 m, 2 m, 5 m, 10 m or 20 m may typically be used, but it will be appreciated that other spacings (including uneven spacings may be used, according to the requirements of a particular embodiment. The electrodes may be arranged to wrap around the whole circumference of the pipe, or may alternatively be arranged to cover one or more segments of the pipe (when seen in cross-section through the diameter of the pipe).

In some embodiments the electrodes may be mounted on conductive (e.g. metallic) plates or frames, that act as a substrate. The plates or frames need not support the electrodes in a planar manner, but may allow for e.g. a curved or angular arrangement of electrodes.

In some embodiments an electrode connected to the signal detector and supported on a first substrate is arranged to receive signals from an electrode, connected to the signal generator, and supported on a second substrate, spatially separated from the first substrate. Such an arrangement allows imaging to take place between separate substrates, such as between two pipes located in reasonably close proximity to each other, where both are fitted with electrodes having impedance compensator circuits attached thereto.

In some embodiments the substrate has located thereon electrodes that are, during at least a part of their use, not connected to a signal detector or signal generator, but have a connection to an impedance compensator, which act as a passive electrode (in the sense of not being a transmit or receive electrode). Such electrodes can act to extend the range of coverage between actively driven transmit or receive electrodes. In an imaging system according to embodiments of the invention, as a current leaves a transmit electrode, some part of the current may be drawn back to a part of the conductive substrate at some point separated from the transmit electrode, providing a further parasitic path for the current to flow. By placing such passive electrodes at positions on the substrate, such parasitic paths may be reduced, leading to greater imaging capability due to an extended range achievable between transmit and receive electrodes. Of course, some electrodes may be switchable between a transmit, a receive, or, when in neither mode, a passive electrode.

According to a further aspect of the present invention there is provided a method of imaging comprising using a system as described herein to generate image data of a medium. The image data obtained from sensor electrodes by the processor may be formed into an image using known techniques.

Figure 2:
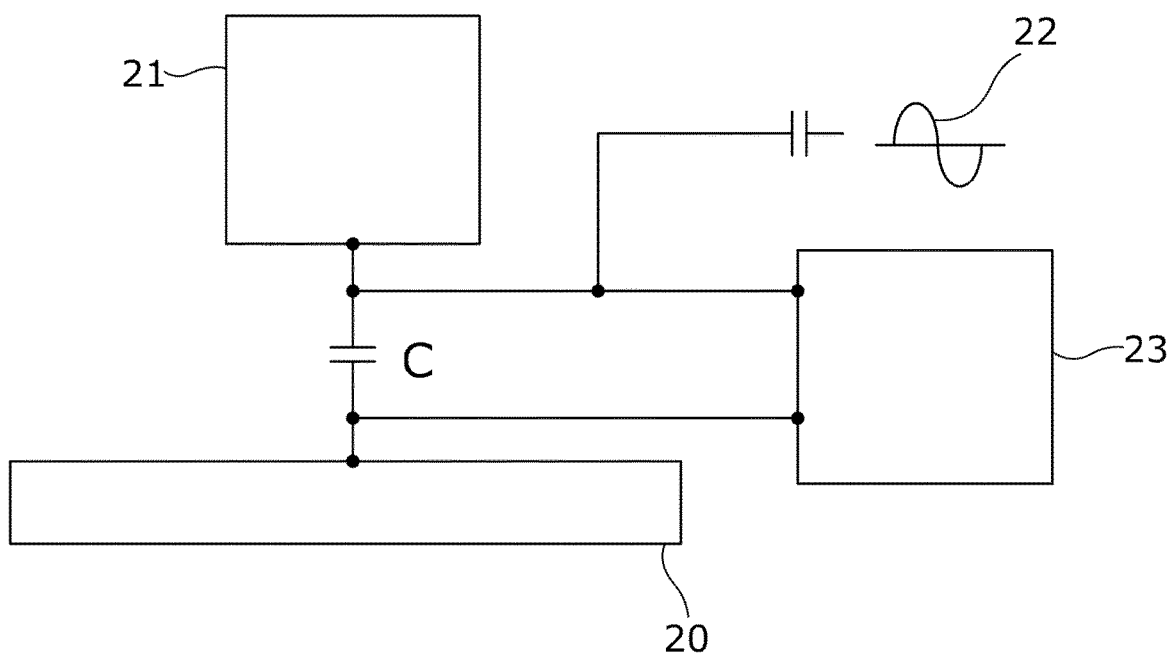
Figure 3:
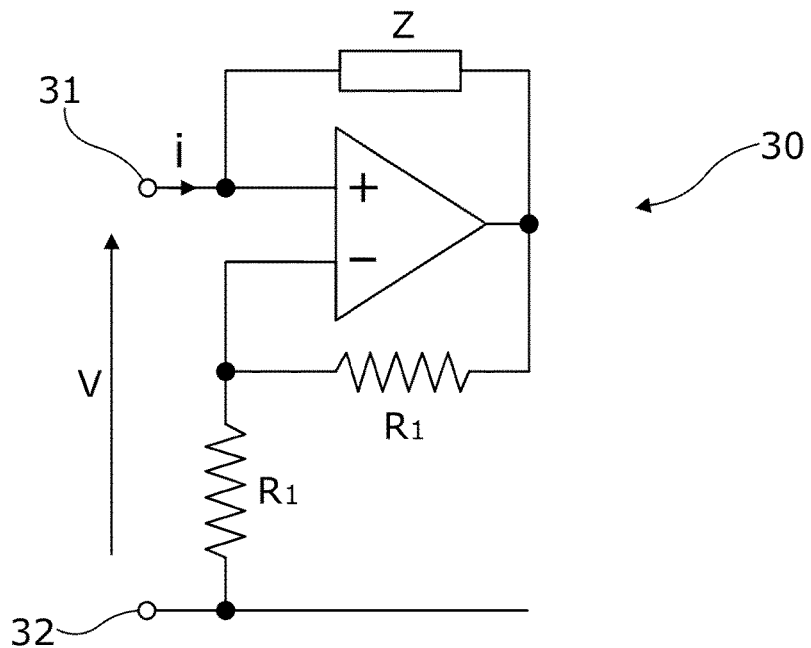
Figure 4:
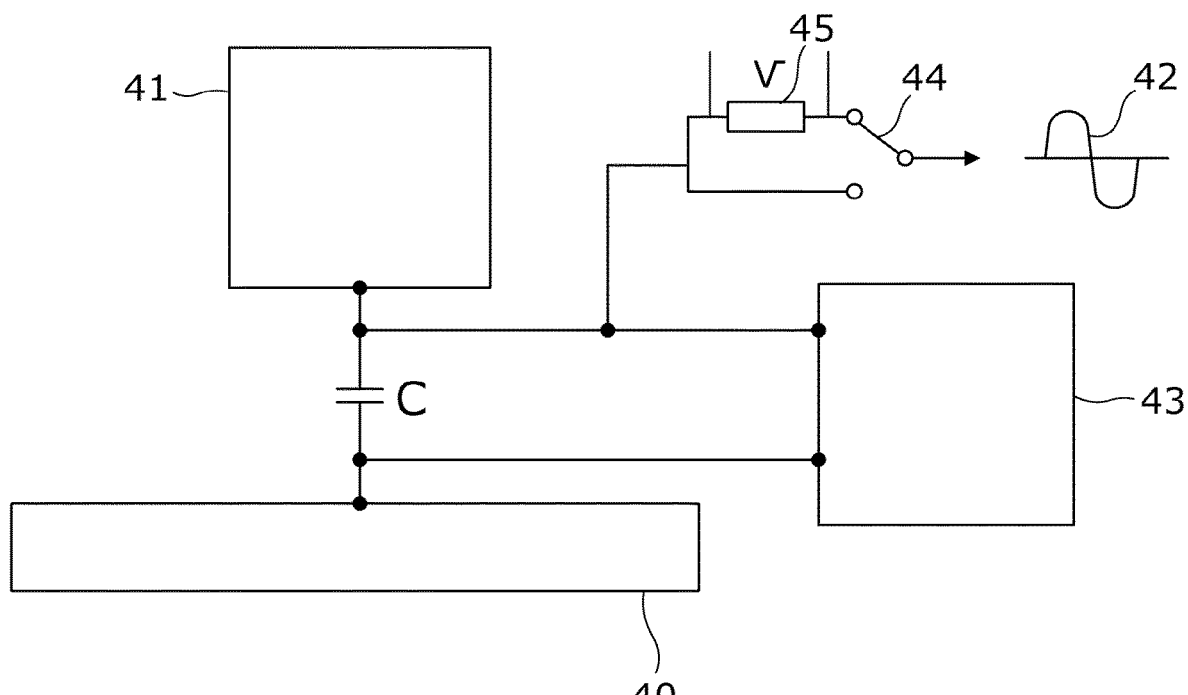
Figure 5:
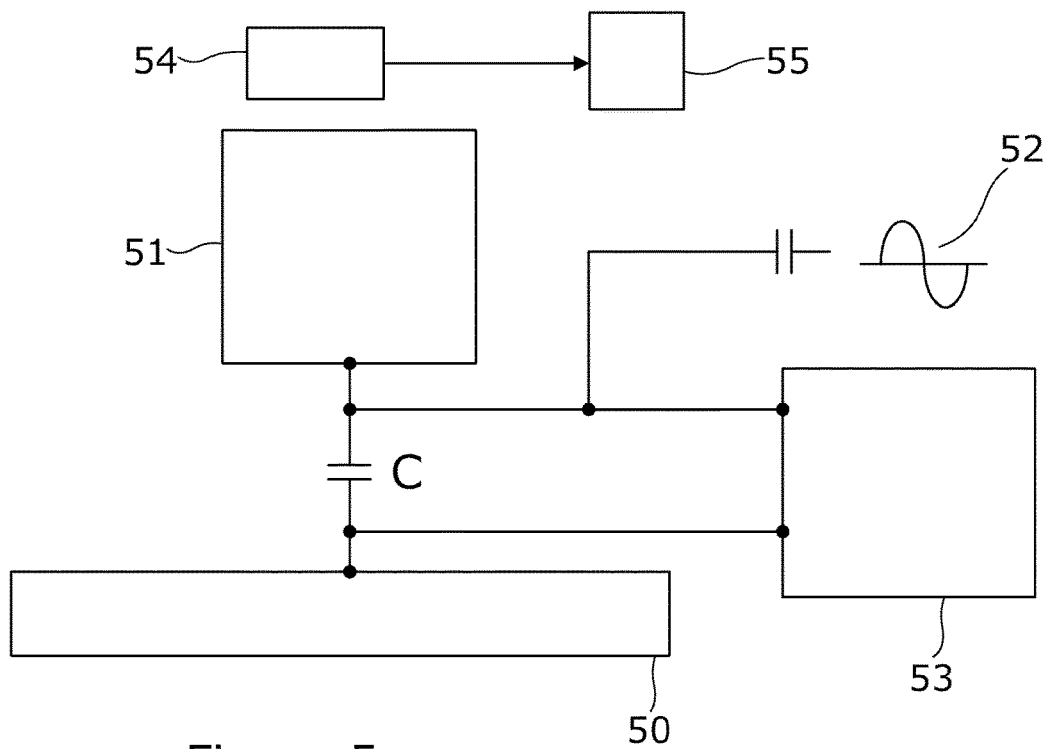
Figure 6:
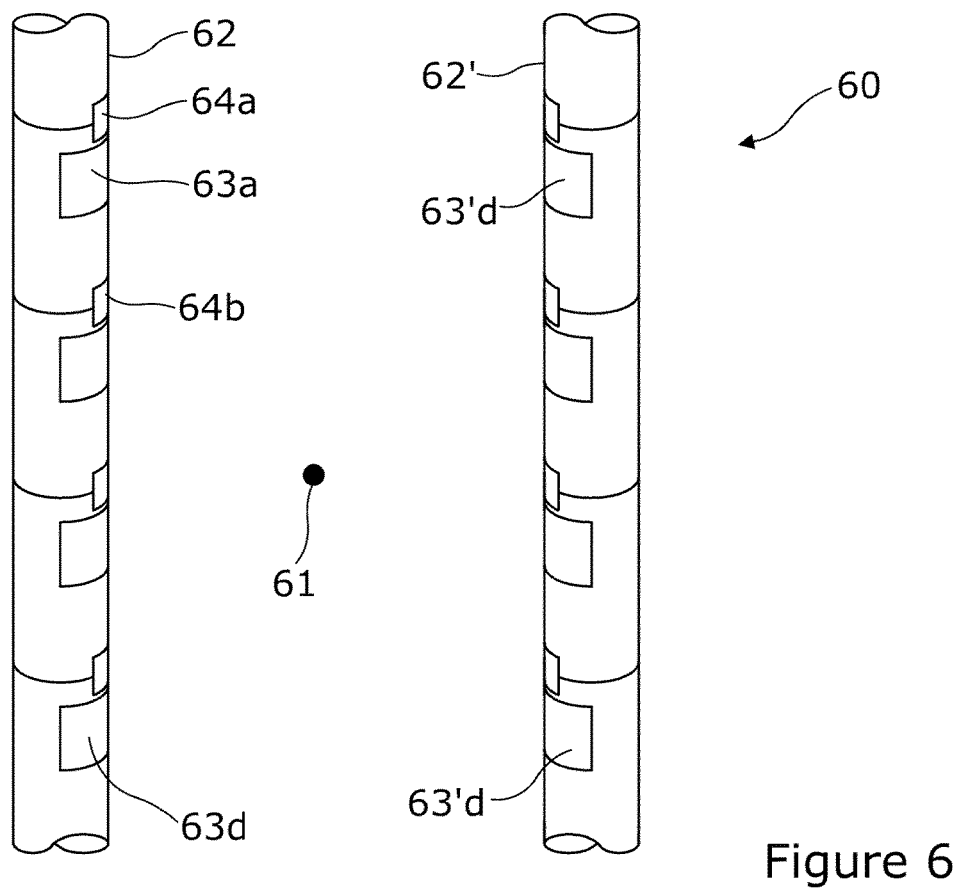

The invention will now be described, by way of example only, with reference to the following Figures, of which:

FIG. 1 diagrammatically illustrates the basic concept of capacitive resistive imaging;

FIG. 2 diagrammatically illustrates an embodiment of the present invention;

FIG. 3 diagrammatically illustrates a simplified circuit diagram for a negative impedance converter suitable for some embodiments of the invention;

FIG. 4 diagrammatically illustrates a means of calibrating an impedance compensator circuit;

FIG. 5 diagrammatically illustrates an alternative means of calibrating an impedance compensator circuit;

FIG. 6 diagrammatically illustrates another embodiment of the invention; and

Figure 7:
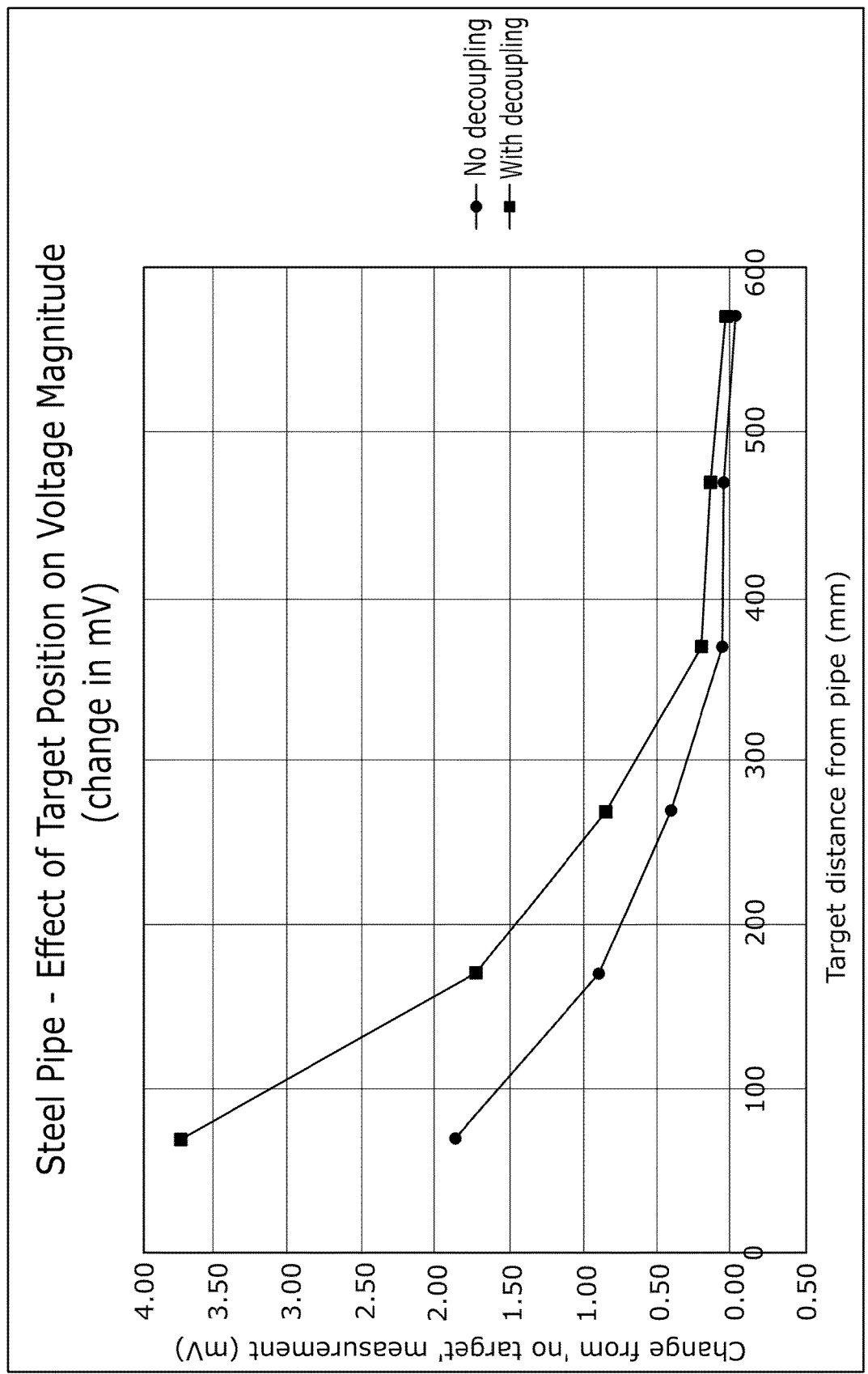

FIG. 7 shows a graph of performance improvements found by using an impedance compensator invention in a laboratory test setup.

FIG. 1 shows a simplified application of capacitive resistive imaging. Here, an imaging system 10 has two transmitter electrodes 11, 12 and two receive electrodes 13, 14 that are capacitively coupled to surrounding medium 15 (such as geology or water). The electrodes 11-14 are mounted on a metallic substrate 18 for structural support. A signal generator 16 supplies a signal to the transmitter electrodes 11, 12, driving the two in anti-phase, so as to maximise a voltage potential between them. This generates an electric field 19 in the medium 15. A signal detector 17 is connected to the receive electrodes 13, 14 and measures a potential difference between each one and the substrate 18 to detect changes in the electric field 19. This known technique can be used for detection of objects or targets, as an object located in the surrounding medium would cause a disturbance to the electrical field created by the transmitter electrodes, which would then be detected by the receiver electrodes and the signal detector attached thereto.

The system shown in FIG. 1 can also be used for resistive imaging by ensuring a galvanic contact between the medium 15 and the electrodes 11-14.

FIG. 2 shows in simplified form an embodiment of the present invention. A metallic substrate 20 has physically mounted thereto an electrode 21. The electrode is electrically insulated from the substrate 20, but there exists a parasitic capacitance C between the two. The electrode 21, in this case a drive electrode (but which could equally be a sensor electrode, or be switchable to be either) is driven by a signal generator 22. An impedance compensator 23 has a first connection to the electrode 21 and a second connection to substrate 20. It also connects to an electrical power source (not shown).

The impedance compensator is a negative impedance circuit that acts to neutralise electrical loads presented to its input, within an operational range. In this embodiment, it is implemented with an operational amplifier circuit (as shown with reference to FIG. 3) to 'track' the input load and apply a corrective negative feedback, resulting in a very high impedance being created between the electrode and the pipe. Although shown in an AC system in FIG. 2, the system will also function at DC, where the impedance compensator may comprise a DC power supply.

FIG. 3 shows in simplified form an example circuit 30 for an impedance compensator as may be used in some embodiments of the invention. The circuit has a terminal 31 for connection to an electrode (e.g. electrode 21 of FIG. 2), and a terminal 32 for connection to a substrate supporting the electrode. As will be well understood by those normally skilled in the art, the circuit acts to supply a current in the opposite direction to that expected given a voltage present between its terminals 31, 32. Conversely, given a current passing through a terminal (e.g. 31) the circuit will generate a voltage opposite to that expected if the circuit presented a resistive load. Standard operational amplifier theory can be used to show that $$Z_{in} = \frac{v}{i} = -Z$$

Thus, by appropriate choice of Z (to match or be close to the parasitic impedance C, as shown in FIG. 2), the negative impedance circuit 30 will act to supply at least some of the current that would otherwise be passing through capacitor C and drawn from the source 22 of FIG. 2. This leaves more of the power drawn from source 22 to go into producing the electric field 19 as shown in FIG. 1. Typically, a compensatory driven voltage from circuit 30 may be higher than that present on the electrode 21 in order to drive an in phase 'blocking' current through the leakage route and then back through a return path.

A circuit such as that shown in FIG. 3 is able to provide compensation over a relatively wide frequency range. Thus, such a circuit does not need to be specifically designed for use at certain narrow frequency bands, but will instead be applicable to various different embodiments working at different frequencies, with little or no modification.

As a hypothetical example illustrating the concept of this power efficiency, assume that there is a desire to pass 1 amp in the medium, and 100V is needed to do this. the power needed will be 100 W. Making the assumption that 50% of the current is lost via coupling to a substrate, then the power in the medium will then be 50 W. Without use of the invention, to restore the geological current to 1 amp, it would be necessary to double the transmitted power to 200 W. However, by using an impedance compensator as described herein, then the compensator will (ideally) supply 50 W through the substrate route leaving the full 100 W from a signal generator to pass into the medium. So, without using the compensator the power needed will be approx. 200 W, but by using the compensator the power needed will be approx. 50 W+100 W, or 150 W, so providing a power saving of about 25%. Note that these figures are not presented as being ones expected in real examples, but are given as an example to show the principle of how embodiments of the invention can lead to a power saving.

FIG. 4 shows a slightly modified version of the system of FIG. 2, the modification enabling a processor (not shown) to calibrate an impedance compensator to account for changes in impedance (e.g. capacitance and/or resistance) between an electrode and its substrate. Note that common components between the two figures are given reference numerals that differ by 20.

As with FIG. 2, FIG. 4 comprises a substrate 40, and an electrode 41, with a parasitic capacitance C between the two. An impedance compensator 43 is connected between the electrode 41 and substrate 40. A signal source 42 is arranged to supply a drive signal (AC, or DC with appropriate and well understood modifications to the system) to the electrode 41. In a normal operation mode, when the signal source is supplying current to the electrode for generation of an EM field within a medium, and the compensator is switched on and providing power through the parasitic capacitance, then switch 44 should be connected to lower path 45, which is a straight connection to the electrode.

When it is desired to calibrate the compensator 43, then the processor commands switch 44 to switch to the upper position, as shown in the figure. Here, a small value resistor (e.g. 1 Ohm) 45 is switched in series into the path between the signal source 42 and the electrode. A voltage v across the resistor 45 is monitored by the processor. Simultaneously to this, a value of −Z, i.e. the effective impedance of the compensator 43 is varied (e.g. using a variable capacitor, or switching different value capacitors into a circuit of the type shown in FIG. 3, or through varying the gain of an amplifier forming part of the circuit). This is continued until a minimum value of v is measured across resistor 45, indicating a minimum current being drawn from signal source 42. This current reduces under these circumstances because current from the source 42 that would otherwise be passing through the parasitic capacitance C is instead being supplied by the compensator 43.

The calibration process is instigated as desired by the processor.

FIG. 5 shows an alternative method of calibrating an impedance compensator. The figure shows a slightly modified version of the system of FIG. 2, the modification enabling a processor (not shown) to calibrate an impedance compensator to account for changes in impedance (e.g. capacitance and/or resistance) between an electrode and its substrate. Note that common components between the two figures are given reference numerals that differ by 30.

As with FIG. 2, FIG. 5 comprises a substrate 50, and an electrode 51, with a parasitic capacitance C between the two. An impedance compensator 53 is connected between the electrode 51 and substrate 50. A signal source 52 is arranged to supply a drive signal to the electrode 51. In addition to the arrangement of FIG. 2, FIG. 5 has a second, calibration electrode 54 located in the vicinity of electrode 51, but positioned further from the substrate 50 than is the electrode 51. Thus, the calibration electrode is able to detect signals from the electrode 51 that are directed into the medium, rather than any such signal passing straight to the substrate 50.

The calibration electrode is connected to a measurement receiver 55 that is able to measure the signal amplitude as detected by the calibration electrode. To perform a calibration, the processor monitors an output from the measurement receiver 55 and provides a signal to electrode 51 from the signal source 52. Simultaneously to this, a value of −Z, i.e. the effective impedance of the compensator 53 is varied (e.g. using a variable capacitor, or switching different value capacitors into a circuit of the type shown in FIG. 3), or by varying the gain of the amplifier.

This is continued until a maximum return from the measurement receiver 55 is found. At this point, the maximum signal from the electrode 51 is being directed away from the substrate 50, indicating that the current required to feed capacitor C is being fed to some degree (and hopefully a large degree) by the compensator 53.

FIG. 6 shows another embodiment of the invention. In this example, an imaging system 60 is arranged to image a medium 61. The system 60 comprise of a first substrate 62, and a second substrate 62', each substrate comprising of a metal pipe buried in the ground. Mounted to each substrate 62 are a plurality of electrodes 63a-d and 63'a-d. Each electrode has an associated controller unit 64. The controller unit 64 for each electrode comprises circuitry to drive its electrode with a signal. It also has an impedance compensator circuit, and a calibration circuit, such as of the type explained above. The controller unit 64 is able to switch each electrode to be a drive electrode or a sensor electrode, and to perform any required calibration of the compensator. The controller unit 64 connects to a cable 65 that runs along the pipes 62 and which provides power and data connection to each controller. The cable goes to a processor and power supply (not shown).

The pipes are positioned having a separation within a measurement range of the electrodes. In other words, a signal from one or more electrodes on one substrate, and arranged to transmit energy into the medium may be detected by an electrode on the other substrate arranged to receive a signal. Thus, in this embodiment, imaging can take place over a larger region of the medium than when on a single linear substrate. Of course, transmission and detection of signals on a single substrate can be performed also, as with the embodiments described above.

FIG. 7 is a graph showing how use of an impedance compensator affects received signal, in a laboratory setup. The medium was a water tank, and a metal pipe within the tank had a single transmit and a single receive electrode located thereon. A target, comprising an enclosed container was positioned in the water tank at varying distances from the pipe, as shown on the horizontal axis of the graph. The vertical axis shows a measurement voltage difference, as measured at the receive electrode, between the target being present at the indicated distance compared to no target present at all. The upper trace, marked with square points is the voltage difference with an impedance compensator switched on, whereas the lower trace is with the compensator switched off. It can be seen that a stronger return signal is received when the compensator is active.

The invention claimed is:

1. An imaging system for imaging of materials, comprising of:
   a plurality of conductive electrodes positionable in an environment to be imaged;
   a signal generator connected to at least two of the electrodes; and
   a signal detector connected to at least two of the electrodes, wherein the electrodes are supported on one or more conductive substrates;
   characterised in that it further comprises an impedance compensator arranged to counter parasitic impedance between each electrode and its substrate, wherein the impedance compensator comprises a negative impedance, wherein the negative impedance is arranged to cancel or reduce a parasitic impedance between a drive electrode and a conductive support.

2. The system as claimed in claim 1 wherein the impedance compensator comprises a negative capacitance, and is arranged to have a negative capacitance between a given electrode and the conductive substrate approximately equal to the capacitance between the given electrode and the conductive substrate.

3. The system as claimed in claim 1 wherein the impedance compensator comprises of a negative resistance.

4. The system as claimed in claim 3 wherein the negative resistance comprises a DC power source arranged to provide a current approximately equal to a current that would flow, in use, between the electrode and the substrate.

5. The system as claimed in claim 1 wherein the negative impedance compensator comprises a one port circuit having an amplifier configured to provide an electrical current between an electrode and its substrate, having an inverse phase compared to that of the connected circuit.

6. The system as claimed in claim 1 wherein each electrode is adapted be switchable so as to function either as a drive electrode where a signal generator is connected to it, or a detector electrode, where a signal detector is connected to it.

7. The system as claimed in claim 1 wherein the system has means for adjusting a supplied current, from the signal generator, based upon a measurement of coupling between its associated electrode and the substrate.

8. The system as claimed in claim 7 wherein the system further comprises a means for measuring the coupling comprising current measuring means for measuring a current flow between the signal generator connected to the electrode and the electrode itself.

9. The system as claimed in claim 7 wherein the system further comprises a means for measuring the coupling comprising a sensor arranged to measure an electric field emanating from the electrode into its surrounding environment, at a position more distant from the substrate than the electrode-substrate distance.

10. The system as claimed in claim 1 wherein there are at least four electrodes, with at least two arranged to connect to the signal generator, and at least two arranged to connect to the signal detector, and wherein the at least two electrodes connected to the signal generator are arranged with the two electrodes connected to the signal detector located between them.

11. The system as claimed in claim 1 wherein there are at least four electrodes, with at least two arranged to connect to the signal generator, and at least two arranged to connect to the signal detector, and wherein the at least two electrodes connected to the signal generator are nearest neighbours to each other, and the at least two electrodes connected to the signal detector are likewise nearest neighbours to each other.

12. The system as claimed in claim 1 wherein an electrode connected to the signal detector and supported on a first substrate is arranged to receive signals from an electrode, connected to the signal generator, and supported on a second substrate, spatially separated from the first substrate.

13. The system as claimed in claim 1 wherein the substrate has located thereon electrodes that are, during at least a part of their use, not connected to a signal detector or signal generator, but have a connection to an impedance compensator.

14. The system as claimed in claim 1 wherein the substrate, or substrates, comprise of metal pipes.

15. The system as claimed in claim 1 wherein the substrate, or substrates comprise of metal plates or frames.

16. A method of imaging comprising using a system as claimed in claim 1 to generate image data of a medium.

* * * * *